(12) United States Patent
Suh et al.

(10) Patent No.: US 9,355,335 B2
(45) Date of Patent: May 31, 2016

(54) IMAGE FILTERING METHOD FOR DETECTING ORIENTATION COMPONENT OF EDGE AND IMAGE RECOGNIZING METHOD USING THE SAME

(75) Inventors: Il-Hong Suh, Seoul (KR); Young-Bin Park, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 35 days.

(21) Appl. No.: 14/233,181

(22) PCT Filed: Feb. 20, 2012

(86) PCT No.: PCT/KR2012/001233
§ 371 (c)(1),
(2), (4) Date: Jan. 16, 2014

(87) PCT Pub. No.: WO2013/012150
PCT Pub. Date: Jan. 24, 2013

(65) Prior Publication Data
US 2014/0153781 A1 Jun. 5, 2014

(30) Foreign Application Priority Data
Jul. 18, 2011 (KR) .................. 10-2011-0070815

(51) Int. Cl.
| | | |
|---|---|---|
| *G06K 9/00* | (2006.01) | |
| *G06K 9/62* | (2006.01) | |
| *G06T 5/20* | (2006.01) | |
| *G06T 7/00* | (2006.01) | |
| *G06K 9/46* | (2006.01) | |

(52) U.S. Cl.
CPC ............ *G06K 9/6202* (2013.01); *G06K 9/4609* (2013.01); *G06T 5/20* (2013.01); *G06T 7/0085* (2013.01); *G06T 2207/10004* (2013.01); *G06T 2207/20192* (2013.01)

(58) Field of Classification Search
USPC .................................................. 382/103, 199
See application file for complete search history.

(56) References Cited

U.S. PATENT DOCUMENTS

| | | | |
|---|---|---|---|
| 7,274,366 B2 | 9/2007 | Jun et al. | |
| 8,538,077 B2 * | 9/2013 | Zitnick, III | ................... 382/103 |

(Continued)

FOREIGN PATENT DOCUMENTS

| | | |
|---|---|---|
| KR | 100764395 B1 | 10/2007 |
| KR | 100780151 B1 | 11/2007 |

(Continued)

OTHER PUBLICATIONS

David G. Lowe; "Distinctive Image Features from Scale-Invariant Keypoints", International Journal of Computer Vision, 60(2), pp. 91-110, Nov. 2004.

(Continued)

*Primary Examiner* — Yon Couso
(74) *Attorney, Agent, or Firm* — Ladas & Parry LLP

(57) ABSTRACT

The present disclosure relates to an image filtering method for detecting an orientation component of an edge and an image recognizing method using the same. The image filtering method includes receiving an original image, generating a plurality of first images by filtering the original image with filters respectively generated along a plurality of channels, generating a second image by selecting a channel having a maximum value for each image unit, from the generated first images, and generating an output image whose edge is detected so as to maintain the consistency of channel by filtering the second image with filters respectively generated along the plurality of channels to generate a plurality of third images and comparing the channel of the second image with the channels of the third images.

19 Claims, 11 Drawing Sheets

(56) References Cited

U.S. PATENT DOCUMENTS

2011/0176744 A1* 7/2011 Ko et al. .................. 382/264
2013/0301910 A1* 11/2013 Mel et al. .................. 382/159

FOREIGN PATENT DOCUMENTS

KR  20100040479 A  4/2010
KR  20110074107 A  6/2011

OTHER PUBLICATIONS

Navneet Dalal, et al; "Histograms of Oriented Gradients for Human Detection", IEEE Computer Society Conference on Computer Vision and Pattern Recognition, 2005, CVPR 2005. Jun. 25, 2005; pp. 886-893, vol. 1.

International Search Report mailed Sep. 19, 2012; PCT/KR2012/001233.

* cited by examiner

Fig. 8c

| 0°, 90° | 0° | 22.5° | 45° | 67.5° | 90° | 112.5° | 135° | 157.5° |
|---|---|---|---|---|---|---|---|---|
| FF | 2760 | 7400 | 9580 | 7340 | 2760 | 7340 | 9580 | 7400 |
| Lateral | 2560 | 2500 | 4880 | 2500 | 2680 | 2500 | 4880 | 2500 |
| FB | 2480 | 2240 | 2168 | 100 | 2483 | 100 | 2169 | 2240 |
| Lateral | 2360 | 20 | 100 | 60 | 2360 | 60 | 100 | 20 |
| FB | 2360 | 20 | 100 | 60 | 2360 | 60 | 100 | 20 |
| Lateral | 2360 | 20 | 100 | 60 | 2320 | 60 | 100 | 20 |
| FB | 2360 | 20 | 100 | 60 | 2320 | 60 | 100 | 20 |

| 45°, 135° | 0° | 22.5° | 45° | 67.5° | 90° | 112.5° | 135° | 157.5° |
|---|---|---|---|---|---|---|---|---|
| FF | 9480 | 9681 | 3240 | 9679 | 9480 | 6480 | 3480 | 6480 |
| Lateral | 5490 | 6260 | 3000 | 6260 | 5497 | 3500 | 3282 | 3500 |
| FB | 1606 | 1587 | 1540 | 1590 | 1615 | 242 | 1720 | 244 |
| Lateral | 100 | 1178 | 1540 | 1209 | 100 | 182 | 1640 | 184 |
| FB | 100 | 40 | 1540 | 40 | 100 | 121 | 1640 | 124 |
| Lateral | 80 | 40 | 1540 | 40 | 80 | 121 | 1640 | 124 |
| FB | 80 | 40 | 1540 | 40 | 80 | 121 | 1640 | 124 |

Fig. 8d

|  | GT | FF | Lateral | FB | Lateral | FB | Lateral | FB |
|---|---|---|---|---|---|---|---|---|
| 0° | 1180 | 1180 | 1180 | 1180 | 1180 | 1180 | 1180 | 1180 |
| 90° | 1220 | 1220 | 1220 | 1220 | 1220 | 1220 | 1220 | 1220 |

|  | GT | FF | Lateral | FB | Lateral | FB | Lateral | FB |
|---|---|---|---|---|---|---|---|---|
| 45° | 820 | 820 | 820 | 820 | 820 | 820 | 820 | 820 |
| 135° | 770 | 770 | 770 | 770 | 770 | 770 | 770 | 770 |

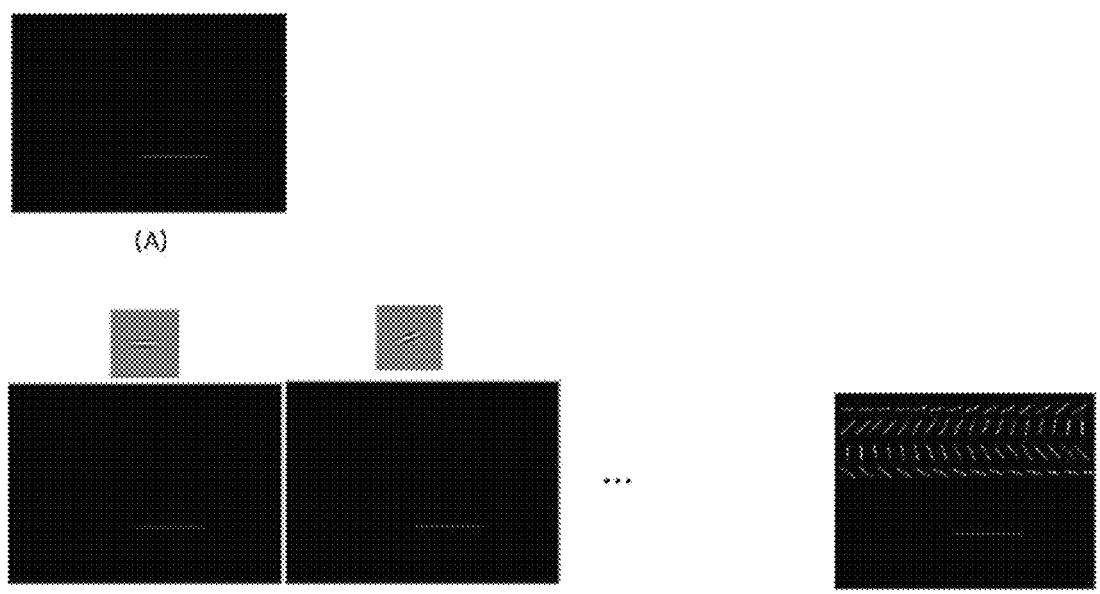

(a) (b) (c) (d)

IMAGE FILTERING METHOD FOR DETECTING ORIENTATION COMPONENT OF EDGE AND IMAGE RECOGNIZING METHOD USING THE SAME

TECHNICAL FIELD

The present disclosure relates to an image filtering method, and particularly, to an image filtering method for detecting an orientation component of an edge of an object at various angles to recognize the object in a computer vision field, an image recognizing method using the same, and a recording medium therefor.

BACKGROUND ART

Computer vision is one of recent study areas in the computer science which studies parts corresponding to a sight vision of a machine, and there have been made continuous attempts to allow a machine to recognize the nature of an object from the information about the object and surrounding images measured by various sensors such as a camera. In this regard, the object recognition technique is one of main techniques of an intelligent robot and is directed to receiving an image of an object based on knowledge information stored by learning in advance and recognizing three-dimensional spatial information such as kind, size, orientation and location of the object in real time. This object recognition technique is a challenge not only in a simple robot field but also throughout overall computer science fields and is also one of difficult tasks which can be accomplished by gradually solving unsettled problems of the artificial intelligence.

At present, the technique for distinguishing an object by using both eyes like a human is a technique with high level of difficulty, which may not be perfectly reproduced for a considerable period. Therefore, object recognition suitable for a product robot may be performed by using a camera or applying a measurement technique such as a laser spatial sensor in a three dimension. For example, impurities may be recognized by scanning the floor, and the kind of an object may be determined using a simple three-dimensional model.

When recognizing an object, it should be preferentially solved to develop a filter for selectively detecting only an edge in a specific orientation from an image. Regarding such a filter, many researchers have been proposed new techniques as proposed in the following literatures, but they are still unsatisfactory.

(Non-patent Literature 1) D. G. Lowe, Distinctive image features from scale-invariant, key points. IJCV, 60 (2):91.110, 2004.

(Non-patent Literature 2) A. Alpher and J. P. N., Fotheringham-Smythe. Frobnication revisited. Journal of Foo, 13 (1):234-778, 2003.

DISCLOSURE

Technical Problem

The present disclosure is directed to solving problems of existing filtering techniques for detecting an edge from an image, which give recognition results different from the human recognition, overcoming the limit of existing filtering techniques, which do not provide accurate filtering results when detecting an edge in a specific orientation, and solving the problem of deterioration of object recognition performance caused by the limit.

Technical Solution

In one aspect, there is provided an image filtering method, which includes: receiving an original image; generating a plurality of first images by filtering the original image with filters respectively generated along a plurality of channels; generating a second image by selecting a channel having a maximum value for each image unit, from the generated first images; and generating an output image whose edge is detected so as to maintain the consistency of channel by filtering the second image with filters respectively generated along the plurality of channels to generate a plurality of third images and comparing the channel of the second image with the channels of the third images.

In the image filtering method, the generating of an output image may include: generating a plurality of third images by filtering the second image with filters respectively generated along the plurality of channels; selecting a channel having a maximum value for each image unit, from the generated third images; comparing the channel selected for each image unit from the third images with the channel of the second image; and generating an output image by adjusting a value of the corresponding image unit according to the comparison result to maintain the consistency of the channel of the second image and the selected channel of the third images.

In addition, the image filtering method may further include feeding back the output image as an input value in the operation of generating the second image.

In another aspect of the present disclosure, there is provided an image recognizing method, which includes: receiving an original image; detecting an edge of a partial image from the original image by means of a predetermined filtering process; and recognizing an object present in the original image by using the detected edge and characteristic images which are classified and stored in advance, wherein the predetermined filtering process includes: generating a plurality of first images by filtering the original image with filters respectively generated along a plurality of channels; generating a second image by selecting a channel having a maximum value for each image unit, from the generated first images; and generating an output image whose edge is detected so as to maintain the consistency of channel by filtering the second image with filters respectively generated along the plurality of channels to generate a plurality of third images and comparing the channel of the second image with the channels of the third images.

In addition, in the image recognizing method, the recognizing of an object present in the original image may recognize an object corresponding to the characteristic images of the partial region which are classified and stored in advance, by using a histogram or hierarchical learning model generated from an orientation component of the detected edge.

In further another aspect of the present disclosure, there is provided a computer-readable recording medium on which a program for executing the above image filtering method and the image recognizing method using the same is recorded.

Advantageous Effects

According to the present disclosure, since the consistency of a filtering process in an image is ensured by using lateral inhibition and inhibitory feedback after performing a feedforward filtering process from an original image, it is possible to generate an output image which gives an effect similar to the human recognition. In addition, since more accurate filtering results are provided when detecting an edge in a specific orientation, the performance of object recognition is improved resultantly.

DESCRIPTION OF DRAWINGS

FIGS. 8a to 8d are diagrams showing measurement results obtained by measuring performance of the image filtering method according to an embodiment of the present disclosure at various angles with respect to a single input image.

FIGS. 9a and 9b are diagrams comparatively showing measurement results obtained by measuring performance of an existing image filtering method and the image filtering method according to an embodiment of the present disclosure at various angles with respect to a single input image.

BEST MODE

Figure 1A:
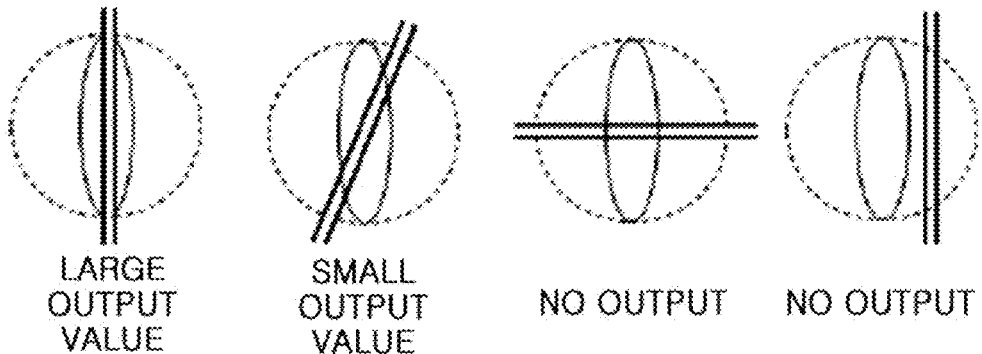
FIG. 1a is a diagram showing a reaction of an orientation selectivity cell of the cerebral neocortex in relation to object recognition of a human.

An image filtering method according to an embodiment of the present disclosure includes: receiving an original image; generating a plurality of first images by filtering the original image with filters respectively generated along a plurality of channels; generating a second image by selecting a channel having a maximum value for each image unit, from the generated first images; and generating an output image whose edge is detected so as to maintain the consistency of channel by filtering the second image with filters respectively generated along the plurality of channels to generate a plurality of third images and comparing the channel of the second image with the channels of the third images.

Mode for Invention

Prior to describing embodiments of the present disclosure, the environment in which the embodiments of the present disclosure are implemented will be introduced, and problems occurring at the environment in which the embodiments of the present disclosure are implemented will be proposed.

As described above, the embodiments of the present disclosure are to propose a filtering method for selectively allowing only an edge in a specific orientation of an input image to pass. So far, various features have been used in the computer vision field to recognize an object, and various attempts to recognize an object by using an estimated orientation of an edge are recently increasing. For example, local area vision feature describing methods such as Scale-Invariant Feature Transform (SIFT) or Histograms of Oriented Gradient (HOG) descriptors generate a histogram with an estimated orientation component of an edge in a local area and use the generated information as important information for recognizing an object. In addition, an object recognition system such as Hierarchical Temporal Memory (HTM) or HMAX also uses an estimated orientation component of an edge as an important vision feature. In these methods, the orientation of an edge is generally classified into 6 to 18 orientations, which is similar to the number of orientations which can be distinguished by a human. Regarding such an edge detection technique, two methods will be introduced as follows.

First, there is a Gabor filter. The Gabor filter is designed to detect edges of various thicknesses and orientations from an image and is composed as the product of a Gaussian function and a sinusoidal function as shown in Equation 1 below.

$$g(x, y; \lambda, \theta, \psi, \sigma, \gamma) = \exp\left(\frac{-x'^2 + \gamma^2 y'^2}{2\sigma^2}\right) \exp\left(i\left(2\pi\frac{x'}{\lambda} + \psi\right)\right) \quad \text{Equation 1}$$

$$x' = x\cos\theta + y\sin\theta,$$

$$y' = -x\sin\theta + y\cos\theta$$

In Equation 1, parameters $\lambda$, $\theta$, $\psi$, $\sigma$, $\gamma$ respectively represent a wavelength, an orientation, a phase, a Gaussian sigma, and an aspect ratio of Gaussian of a filter. Therefore, if it is intended to detect edges of an image in 8 orientations (0°, 22.5°, 45°, 67.5°, 90°, 112.5°, 135°, 157.5°), eight Gabor filters are generated by adjusting only parameters relating to the orientation while fixing the other parameters, and then the image is convoluted with each filter.

Second, there is a Neumann method. The Neumann method is also a filter designed to detect edges in various orientations from an input image. In the Neumann method, the process for detecting an edge of a specific orientation is divided into three stages, namely stages of LGN on- and off cells, simple cell, and complex cell. In the stage of LGN on- and off cells, a bright pixel surrounded by dark pixels is activated in an off-channel. Meanwhile, a dark pixel surrounded by bright pixels is activated in an on-channel. During this process, the degree of activation is entirely calculated by difference-of-Gaussians (DOG). In the stage of simple cell, all of the on- and off-channels in the LGN process are convoluted with Gaussian filters inclined in a specific orientation. The equation of the Gaussian filter for the above is like Equation 2 below.

$$g(x', y') = \frac{1}{2\pi\lambda\sigma^2}\exp\left[-\frac{(x'/\lambda)^2 - y'^2}{2\sigma^2}\right] \quad \text{Equation 2}$$

$$x' = x\cos\theta + y\sin\theta,$$

$$y' = -x\sin\theta + y\cos\theta$$

In Equation 2, $\lambda$ represents an aspect ratio of Gaussian. If it is intended to detect edges of an image in eight orientations (0°, 22.5°, 45°, 67.5°, 90°, 112.5°, 135°, 157.5°), eight Gaussian filters are generated by adjusting only parameters relating to the orientation, and then the image is convoluted with each filter. In this process, edges in a specific orientation are detected, but the edges in each operation are classified into a group in which a left side is dark and a right side is bright based on the center orientation axis and a group in which a left side is bright and a right side is dark. In the stage of complex cell, two groups present in each orientation are integrated. Edges in each orientation are detected through the above process.

Now, limits and problems of these image filtering methods will be described with reference to FIGS. 1a and 1b.

FIG. 1a is a diagram showing a reaction of an orientation selectivity cell of the cerebral neocortex in relation to object recognition of a human, in which an oval in each circle represents a cell and the orientation of the oval represents an orientation of an edge preferred by the cell during the recognition process. Therefore, cells depicted in FIG. 1a represent cells for detecting a vertical line. If an input signal of a vertical line is located at the center of a cell as in the first case, the cell has a large output value (which means that the vertical line is recognized very strongly). In addition, if a line slightly inclined from the vertical line is put into the input signal as in the second case, the output signal is small. Meanwhile, if the horizontal line is given as an input signal as in the third case, there is no output signal (namely, the output signal is not recognized). In addition, if a vertical line is input but departs from a range (oval) recognizable by a cell as in the fourth case, there is also no output signal.

Meanwhile, the Gabor filter and the Neumann method are based on 2D convolution as described above. FIG. 1b is a diagram for illustrating a method for convoluting an image by using a filter with directivity, which illustrates that the Gabor filter and the Neumann method are different from actual operation of an orientation selectivity cell of a human as shown in FIG. 1a.

Figure 1B:
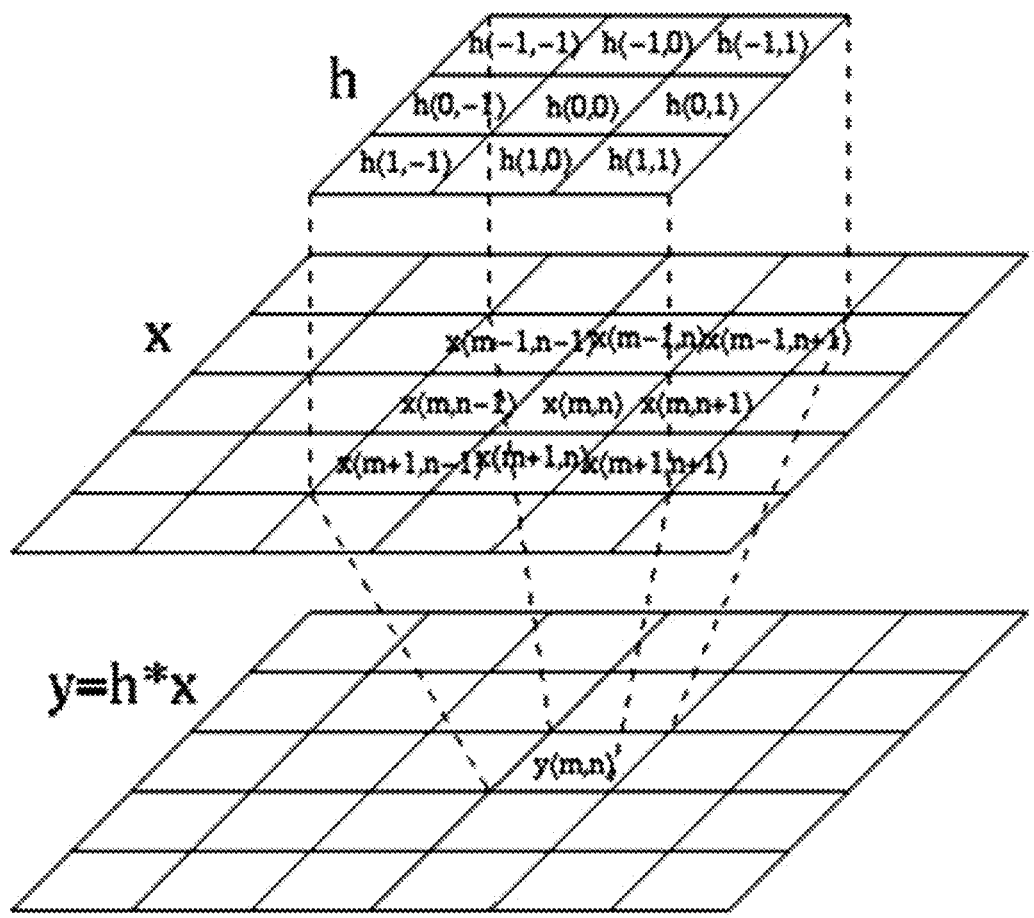
FIG. 1b is a diagram for illustrating a method for convoluting an image by using a filter with directivity.

First, the convolution of FIG. 1b is performed according to Equation 3 below.

$$y(m, n) = x(m, n) * h(m, n) \qquad \text{Equation 3}$$
$$= \sum_j \sum_i x(i, j) \cdot h(m-i, n-j)$$

In Equation 3, x represents an input image, h represents a filter, and y represents a channel. Therefore, the number of filters is determined to be identical to the number of channels. According to Equation 3, if the input signal is small, even though a main orientation of the filter is not exactly identical to the orientation of the input line, the output signal may be small. However, if the input signal is great, even though the main orientation of the filter is slightly different from the orientation of the input line, the output signal may be greater than the former case. Further, if the input line is given to be perpendicular to the orientation of the filter, an output signal of a certain size may be generated. Therefore, conventional filters based on the convolution of FIG. 1b generate results different from the reaction of an orientation selectivity cell of the cerebral neocortex of a human.

In order to solve the above problem, embodiments of the present disclosure propose an image filtering method which gives effects similar to those of the object recognition of a human. For this, the embodiments of the present disclosure proposes a band-pass filtering method, which divides all orientations into eight center orientations (0°, 22.5°, 45°, 67.5°, 90°, 112.5°, 135°, 157.5°), and allows only edges of +22.5°, −22.5° based on the center orientation to pass. At this time, edges passing with respect to the specific orientation are designed so that if an edge is spaced farther from each center orientation, a ratio of the intensity of an output signal to the intensity of the input signal is relatively decreased. In other words, if the filtering orientation is more different from the orientation of the filtered signal, an output value for the signal is relatively decreased. Hereinafter, this effect will be called the consistency of channel.

Figure 2:
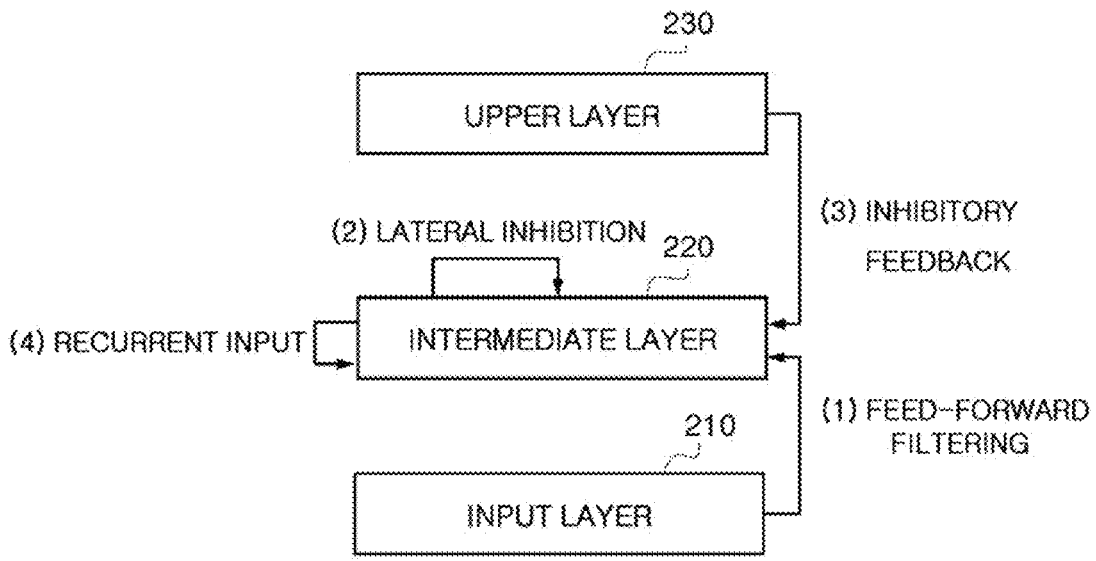
FIG. 2 is a diagram for illustrating the outline and basic idea of an image filtering method, adopted in embodiments of the present disclosure.

FIG. 2 is a diagram for illustrating the outline and basic idea of an image filtering method, adopted in embodiments of the present disclosure. In FIG. 2, an input layer 210 represents an original image whose edge is to be detected, and an intermediate layer 220 represents an image generated from the input layer 210, the intermediate layer 220 or an upper layer 230 through a series of operations. In addition, the intermediate layer 220 may also represent an output image finally generated. Finally, the upper layer 230 represents an image which is generated during an inhibitory feedback process, described later.

As shown in FIG. 2, embodiments of the present disclosure propose a method for imitating a visual recognition process of the cerebral neocortex of a human. The brain of a human is a network in which numerous neurons have complicated connection relations. Information generated from a single neuron is small and limited, but a human may analyze the information obtained by vision since many neurons exchange information through such complicated connections. Various connections of the network may be generally classified into feed-forward, feedback, lateral and recurrent connections. At this time, different connection types provide information with different properties from each other.

First, the feed-forward stage conforms to a general image filtering method for detecting an edge and may utilize the Gabor filter or the Neumann method. In addition, the feed-forward connection relation allows information of a small unit to be collected from a low-rank neuron group connected to a high-rank neuron.

Second, the lateral inhibition represents a process of selecting an image value in an orientation, which has a maximum value, for each basic unit (which may be, for example, a pixel) of a corresponding image, in the image of the intermediate layer 220.

Third, the inhibitory feedback adjusts an image value of a basic unit of each image from the upper layer 230 generated by filtering the intermediate layer 220 in each orientation so that the consistency of channel is maintained. This feedback connection relation transfers the information of a high-rank neuron with a great unit to low-rank groups connected thereto.

Fourth, the recurrent input stage inputs the output image (which means the intermediate layer) generated through the lateral inhibition and the inhibitory feedback, which are respectively the second stage and the third stage, as an input image again to repeat the above procedure.

As described above, the embodiments of the present disclosure propose a structure for implementing a technical scheme by adopting four kinds of connection relations required for imitating the visual recognition process of the cerebral neocortex of a human. Since edges of an image in all orientations are treated through such four kinds of connection relations, the edges may be effectively removed while remaining only an edge in a desired specific orientation stage by stage. Each stage will be described below in more detail with reference to the accompanying drawings.

Figure 3:
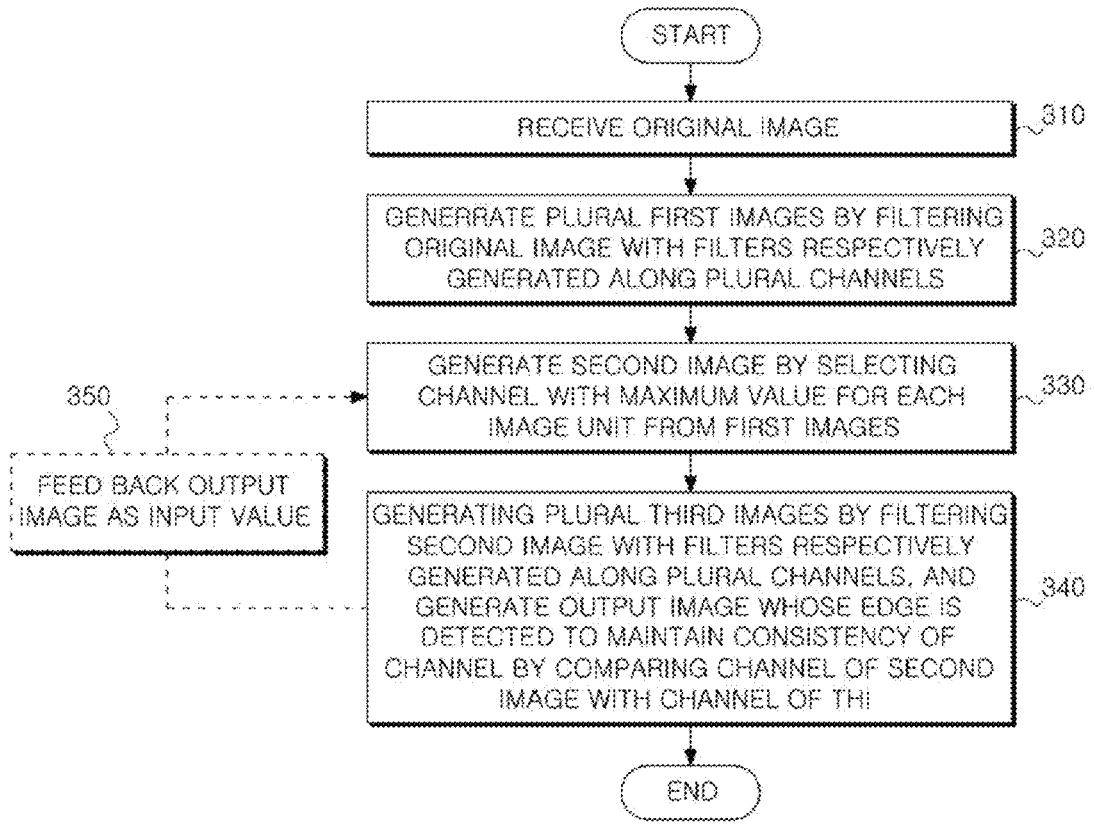
FIG. 3 is a flowchart for illustrating an image filtering method according to an embodiment of the present disclosure.

FIG. 3 is a flowchart for illustrating an image filtering method according to an embodiment of the present disclosure, and only its outline is introduced herein. FIG. 3 will be described later in more detail with reference to FIGS. 4 to 6.

In Operation 310, an image filtering device receives an original image.

In Operation 320, the image filtering device filters the original image input in Operation 310 with filters respectively generated along a plurality of channels to generate a plurality of first images. At this time, the channel represents a preset specific angle, and the filter generated along the channel represents a technical means which may selectively detect an image of a preset specific angle from the input image. In addition, the image may be filtered by convoluting the input image and a Gaussian filter generated along the channel.

In Operation 330, the image filtering device selects a channel having a maximum value for each image unit from the first images generated in Operation 320 to generate a second image. At this time, the image unit represents a basic unit which is subject to operation in the image, and a pixel is widely used in the art which the present disclosure belongs to.

In Operation 340, the image filtering device filters the second image generated in Operation 330 with filters respectively generated along a plurality of channels to generate a plurality of third images, and compares the channel of the second image with the channels of the third images for each image unit, thereby generating an output image whose edge is detected to maintain the consistency of channel.

Meanwhile, even though an output image may be generated just with a series of operations as described above, in order to improve the quality of edge detection, a feedback process (Operation 350) may be selectively further executed. In other words, in Operation 350, the output image generated in Operation 340 may be fed back as an input value of Operation 330 for generating the second image. This feedback process is repeated a predetermined number of times as proved through experiments, which may optimize the quality of the output image whose edge is detected.

Figure 4:
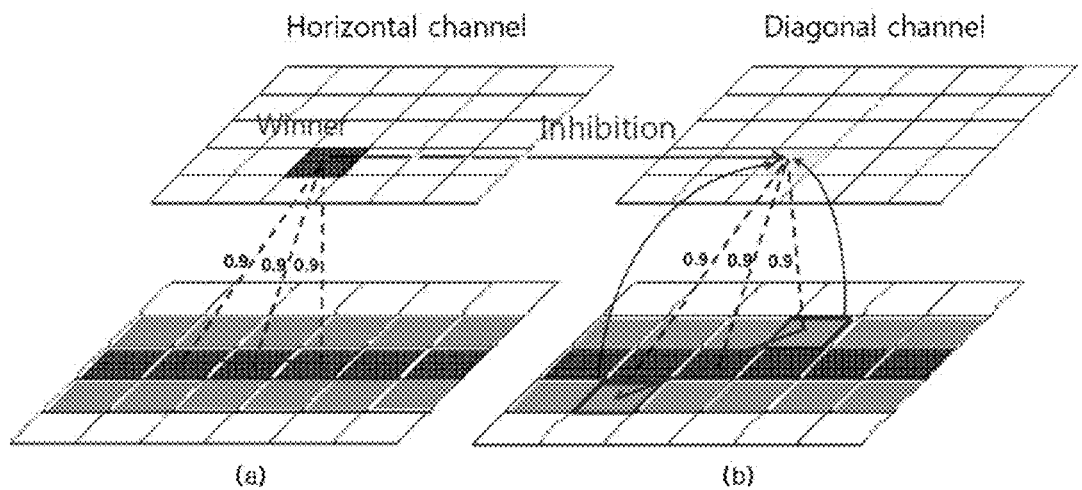
FIG. 4 is a diagram for illustrating a method for generating a second image by using lateral inhibition in the image filtering method of FIG. 3 according to an embodiment of the present disclosure.

FIG. 4 is a diagram for illustrating a method for generating a second image by using lateral inhibition in the image filtering method of FIG. 3 according to an embodiment of the present disclosure. First, a process of generating a first image is described. FIG. 4 shows a simplified form of a filter for detecting an edge in a specific orientation for convenience, and another embodiment of the present disclosure may also utilize a Gabor filter, Neumann filter or a Gaussian filter according to a technical means used. In FIG. 4, the dark gray represents that the corresponding value is greatly activated, and the light gray represents the value is weakly activated. In addition, x represents an input layer, a superscript m represents an intermediate layer, and h represents a filter. Subscripts h and d respectively represent horizontal and diagonal. Even though the image may be filtered at various angles, just horizontal and diagonal operations are shown herein for convenience. Numeral in the filter represents a weight of the filter.

In FIG. 4, (a) reveals that a result obtained by convoluting a horizontal line as a horizontal edge-selective filter is shown an a diagonal channel of the intermediate layer, and (b) reveals that a result obtained by convoluting a horizontal line as a diagonal edge-selective filter is shown in a horizontal channel of the intermediate layer. In addition, the number of channels employed in this embodiment is eight, which however may be changed in various ways when implementing the image filter.

The process of FIG. 4 shows the feed-forward filtering and the lateral inhibition in the image filtering process of the fourth stage described above, and the equations relating to convolution described above may be used to perform this operation. Therefore, the feed-forward filtering process may be easily understood by those skilled in the art of the present disclosure and therefore is not described in detail here.

Now, assuming that each channel after the feed-forward filtering is $y_\theta^{ff}$, the channel value becomes an initial value of each channel in the intermediate layer as defined in Equation 4 below.

$$y_\theta^m = y_\theta^{ff} \quad \text{Equation 4}$$

After the feed-forward filtering process is performed, if the output value of the horizontal channel is greater than the output value of the diagonal channel in the intermediate layer as shown in FIG. 4, the output value of the horizontal channel will be a winner. If this is generalized, at each pixel location of the intermediate layer, all intermediate layer channels are checked and a single winner is selected so that the corresponding channel has a greatest value. After that, at each pixel location, the value of each channel other than the winner is inhibited (namely, the corresponding channel value is excluded) according to a ratio of the winner to a value of the other channel. This process means the lateral inhibition. The output value after the lateral inhibition is as shown in Equation 5 below.

$$y(m,n)_\theta^l = y(m,n)_\theta^m \text{ if } y(m,n)_\theta^m / y(m,n)_{max}^m > T^l$$

$$y(m,n)_\theta^l = y(m,n)_\theta^m \cdot e^{-(y(m,n)_{max}^m - y(m,n)_\theta^m)/k} \text{ else} \quad \text{Equation 5}$$

In Equation 5, a superscript l represents a lateral stage, θ represents each channel (namely, orientation or angle), and $y(m,n)_{max}^m$ represents a winner at the coordinate (m, n) in the image.

As a result, in FIG. 4 according to the above method, since the value of (a) by the horizontal channel is greater than the value of (b) by the diagonal channel (a darker color is used for visual checking), the channel value of (a) inhibits the channel value of (b).

Figure 5A:
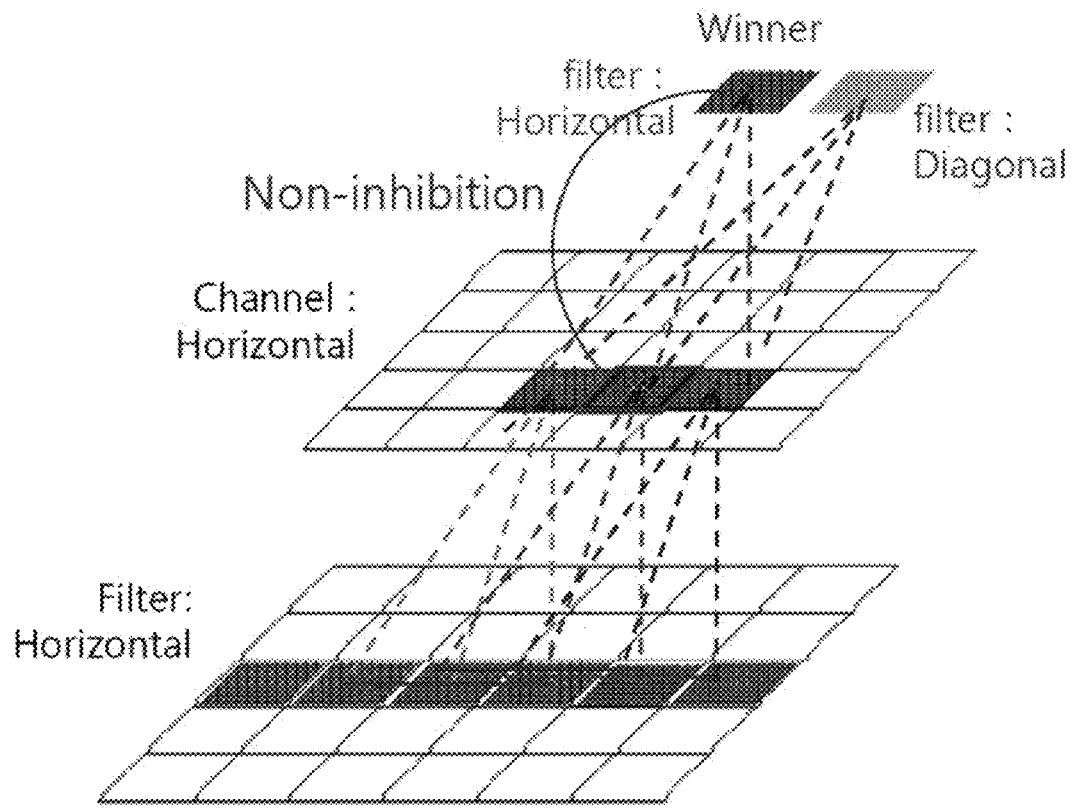
FIGS. 5a and 5b are diagrams for illustrating a method for generating an output image by using inhibitory feedback in the image filtering method of FIG. 3 according to an embodiment of the present disclosure.
Figure 5B:
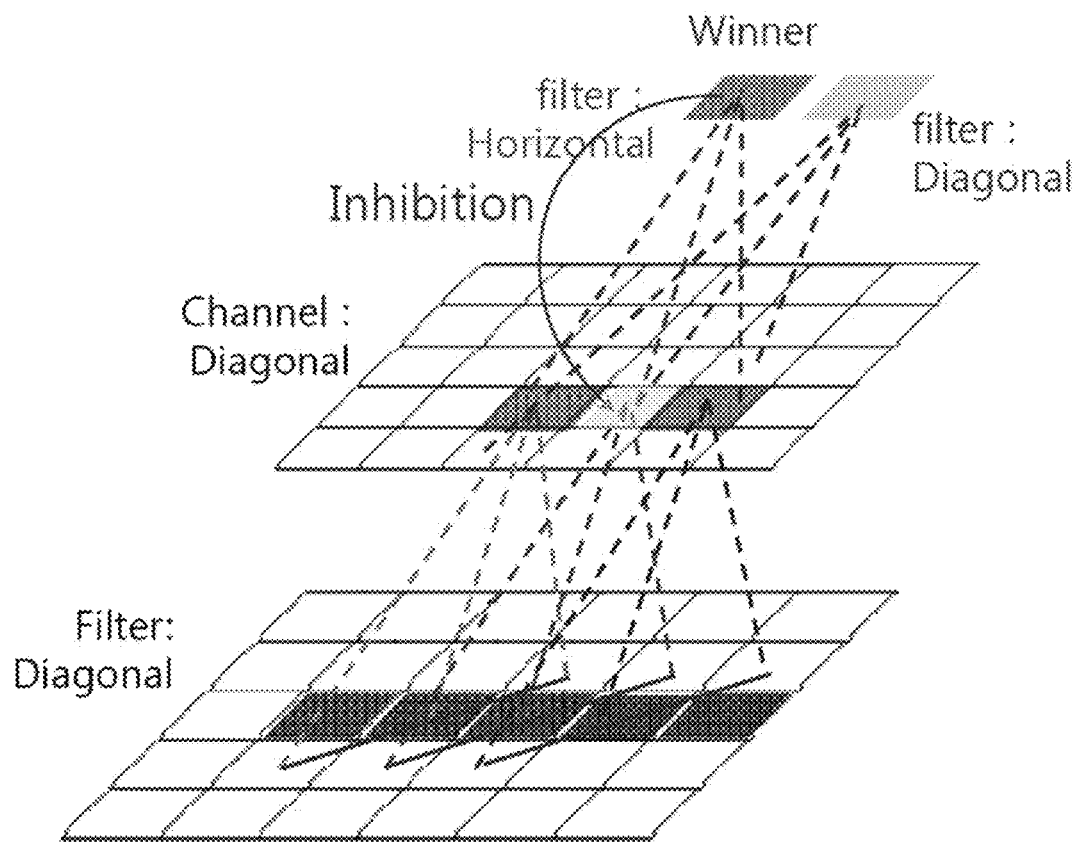

FIGS. 5a and 5b are diagrams for illustrating a method for generating an output image by using inhibitory feedback in the image filtering method of FIG. 3 according to an embodiment of the present disclosure, and a superscript t represents the upper layer. FIG. 5a shows a result obtained by convoluting an output value of the horizontal channel of the intermediate layer with a horizontal edge-selective filter and a diagonal edge-selective filter, and FIG. 5b shows a result obtained by convoluting an output value of the diagonal channel of the intermediate layer with a horizontal edge-selective filter and a diagonal edge-selective filter. In both FIGS. 5a and 5b, the input signal is a horizontal line.

In this embodiment, the inhibitory feedback is performed according to the following mechanism. First, referring to FIG. 5a, among the output values of the upper layer, it may be found that the output value of the horizontal channel is greater than the output value of the diagonal channel. In this case, there is no inhibition at the target pixel of the horizontal intermediate layer. Meanwhile, in FIG. 5b, among the output values of the upper layer, the output value of the horizontal channel is greater than the output value of the diagonal channel. In this case, inhibition is applied at the target pixel of the diagonal intermediate layer.

If this inhibiting process is generalized for the case of detecting edges in eight orientations, eight channels of the intermediate layer are respectively convoluted as filters in eight orientations, so that each intermediate layer channel has eight upper layer output channels. Among the eight upper layer output channels, a winner is selected according to the size of the output value of each pixel. If the channel of the winner has the same orientation as the intermediate layer channel, there is no inhibition, and if not, the inhibition is applied.

This process is to maintain the consistency of channel as described above, and the inhibitory feedback process for maintaining the consistency of channel is basically based on the following assumption. In other words, in the intermediate layer, the orientation of a pattern of adjacent output values present in a channel of a specific orientation should be identical to the orientation of the channel. For example, this means that if the filtering process is properly performed, the orientation of a pattern of output values adjacent to the horizontal channel should be the horizontal orientation. Therefore, in order to maintain the consistency of channel, a relatively higher value may be set if the channel generating the second image (which means the intermediate layer) is identical to the channel selected for generating the third image (which means the upper layer).

This inhibitory feedback process may be expressed as Equation 6 below.

$$y(m,n)_\theta^{fb} = y(m,n)_\theta^m \text{ if } y(m,n)_{max}^{t'}\text{max}=\theta$$

$$y(m,n)_\theta^{fb} = 0 \text{ else} \qquad \text{Equation 6}$$

In Equation 6, a superscript fb represents a feedback stage, and $y(m,n)_{max}^{t'}\text{max}=\theta$ means that a channel of a winner is $\theta$ at the coordinate (m, n) in an image.

As a result, in FIG. 5a, the channel of the intermediate layer is the channel in the horizontal orientation, and the channel which is a winner in the upper layer is also the channel in the horizontal orientation. Therefore, there is no inhibition (non-inhibition). Meanwhile, in FIG. 5b, the channel of the intermediate layer is the channel of the diagonal orientation, and the channel which is a winner in the upper layer is the channel in the horizontal orientation. Therefore, the channels of both layers are not identical to each other. For this reason, in order to maintain the consistency of channel, a channel value is reduced (or, inhibited) and allocated to a pixel corresponding to a channel in the horizontal orientation which is a winner.

Figure 6:
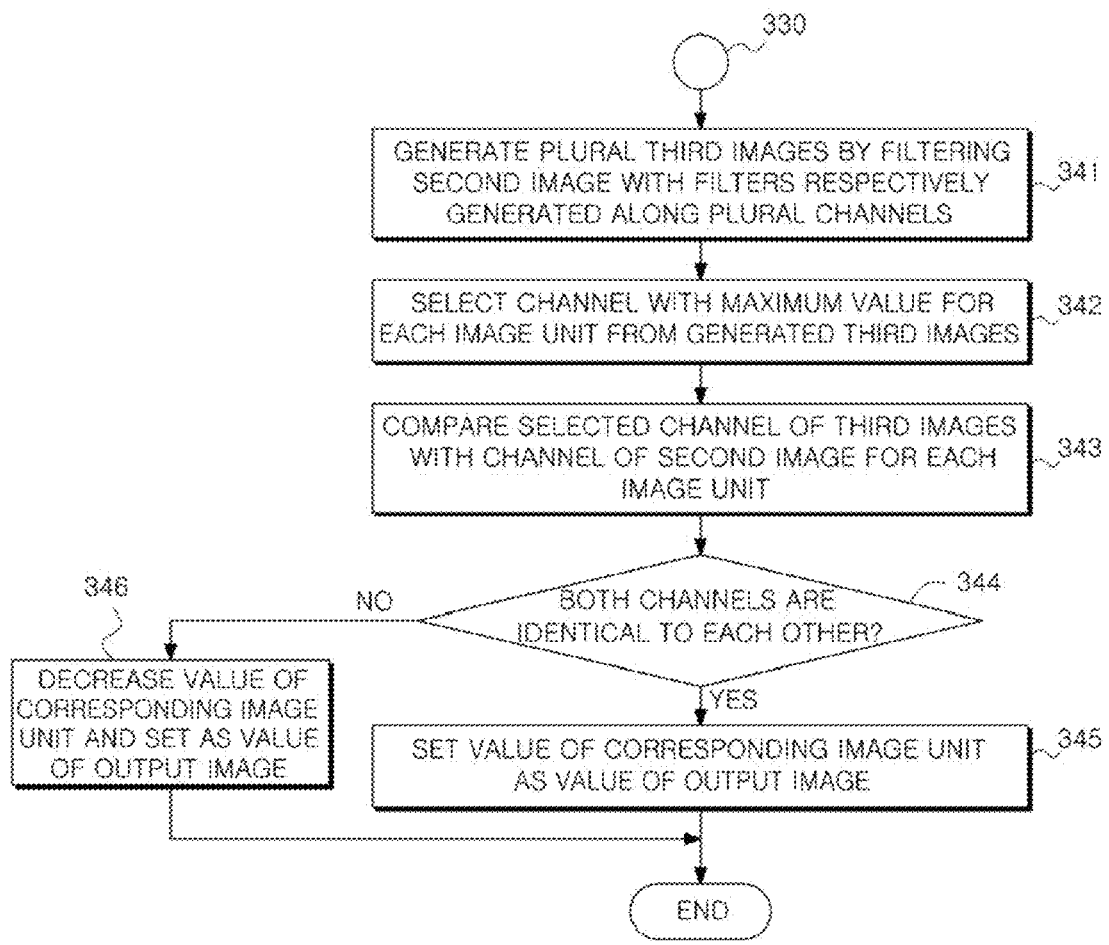
FIG. 6 is a detailed flowchart for illustrating the method for generating an output image by using inhibitory feedback in the image filtering method of FIG. 3 according to an embodiment of the present disclosure.

FIG. 6 is a detailed flowchart for illustrating the method for generating an output image by using inhibitory feedback in the image filtering method of FIG. 3 according to an embodiment of the present disclosure and shows the process after Operation 330 for generating the second image as shown in FIG. 3, according to the detailed calculating process of FIGS. 5a and 5b.

In Operation 341, the image filtering device generates a plurality of third images by filtering the second image (which means the intermediate layer) with filters respectively generated along a plurality of channels.

In Operation 342, the image filtering device selects a channel having a maximum value for each image unit among the third images generated in Operation 341.

In Operation 342, the image filtering device compares the channel selected for each image unit from the third images with the channel of the second image (Operation 344). After that, the image filtering device adjusts a value of the corresponding image unit according to the comparison result (according to whether both channels are identical to each other or not) to maintain the consistency of the channel of the second image and the channel selected from the third images, thereby generating an output image.

In more detail, if the channel of the second image is identical to the selected channel of the third images, the process proceeds to Operation 345 to set the corresponding image unit as a value of the output image. This process corresponds to the calculating process of FIG. 5a described above. Meanwhile, if the channel of the second image is not identical to the selected channel of the third images, the process proceeds to Operation 346 to decrease the value of the corresponding image unit and set as a value of the output image. This process corresponds to the calculating process of FIG. 5b described above.

Meanwhile, after the inhibitory feedback process, the value of the channel is used as an output value of the intermediate layer, and the output value may also be used again as an input of the lateral inhibition process according to Equation 7 below.

$$y(m,n)_\theta^m = y(m,n)_\theta^{fb} \qquad \text{Equation 7}$$

Equation 7 corresponds to the recurrent feedback process (Operation 350) described above with reference to FIG. 3, and this cycle of the lateral inhibition process→the inhibitory feedback process→the recurrent feedback process may be repeated until the output value of the intermediate layer converges on a certain value. This recurrent process may be selectively and flexibly performed according to the implementation environment of the image filtering method.

According to the embodiments of the present disclosure, after the feed-forward filtering process, since the consistency of the filtering process in an image may be ensured by means of lateral inhibition and inhibitory feedback, it is possible to generate an output image giving an effect similar to the object recognition of a human, and it is also possible to provide a more accurate filtering result when detecting an edge in a specific orientation.

Hereinafter, various experiment results will be proposed to prove the performance of the embodiments of the present disclosure.

Figure 7:
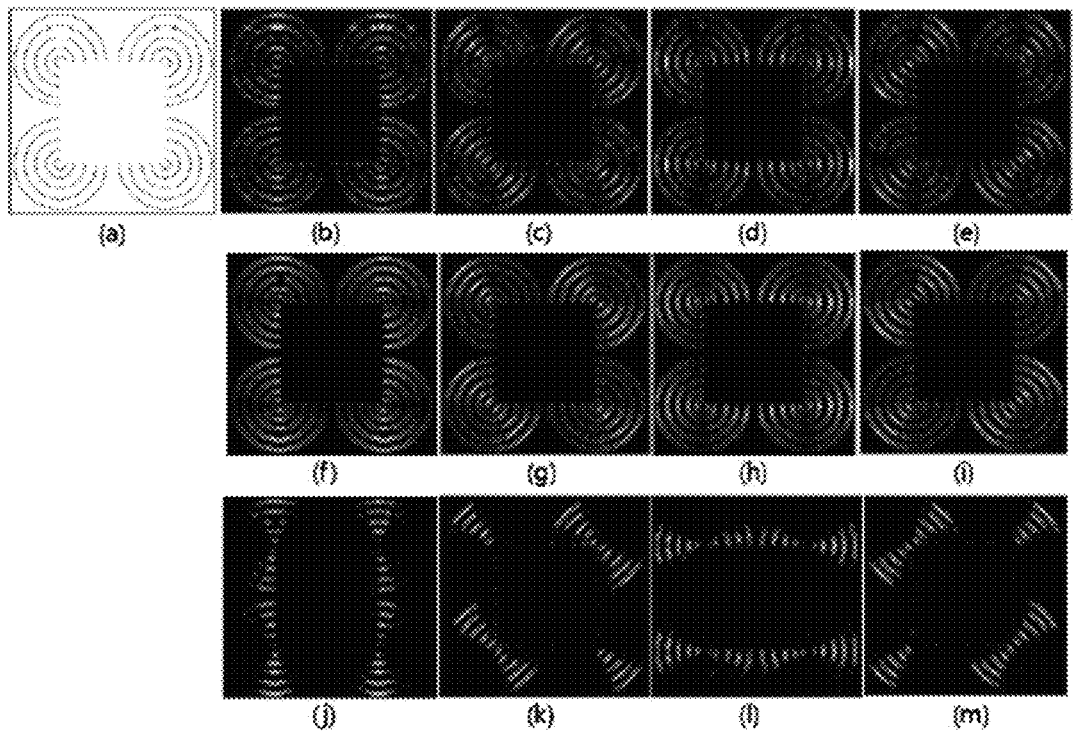
FIG. 7 is a detailed diagram comparatively showing output images according to an existing image filtering method and the image filtering method according to an embodiment of the present disclosure.

FIG. 7 is a detailed diagram comparatively showing output images according to an existing image filtering method and the image filtering method according to an embodiment of the present disclosure. In FIG. 7, (a) shows an original input image, (b) to (e) show channels generated by a Gabor filter, and (f) to (i) show channels generated by a Neumann method. Finally, (j) to (m) show channels generated by the method according to the embodiments of the present disclosure.

Channels in first to fourth columns show results obtained by filters which adopts four orientations (0°, 45°, 90°, 135°) as main orientations. If comparing the channel in the first column, it may be found that the Gabor filter and the Neumann method allows edges in orientations greatly different from 0° to pass through (namely, the filter does not allow only an edge in an orientation desired by a user not to pass).

Meanwhile, in the image filtering method proposed in the embodiments of the present disclosure, it may be found that only edges within the range of about +22.5° to −22.5° from 0° pass (namely, the filter allows only an edge in an orientation desired by a user to pass). Similar results have been obtained in channels of other columns.

Hereinafter, an experiment using two artificial images and an experiment using a single general image have been additionally performed, and their results have been analyzed.

The first artificial image is proposed through FIGS. 8a to 8d. FIGS. 8a to 8d are diagrams showing measurement results obtained by measuring performance of the image filtering method according to an embodiment of the present disclosure at various angles with respect to a single input image.

Figure 8A:
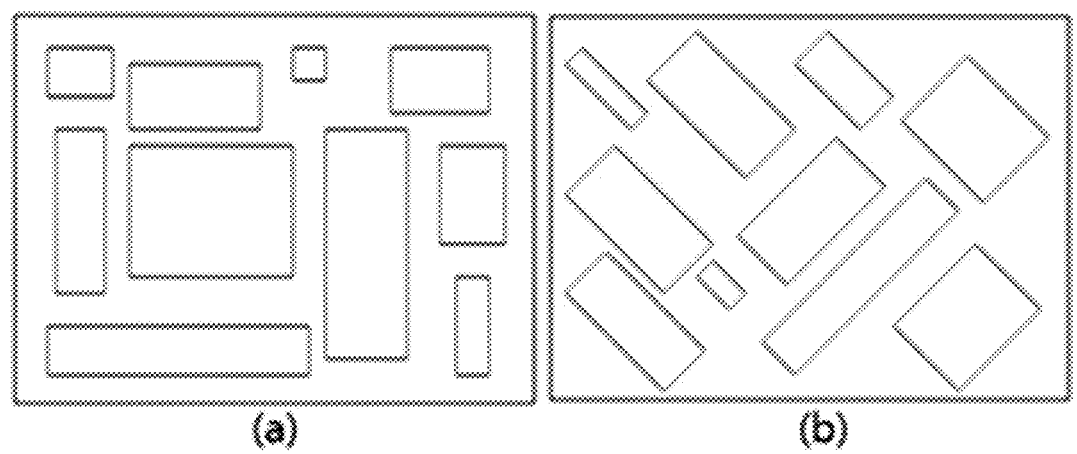

In FIG. 8a, (a) includes a straight line composed of only (0°, 90°), and (b) includes a straight line composed of only (45°, 135°).

Figure 8B:
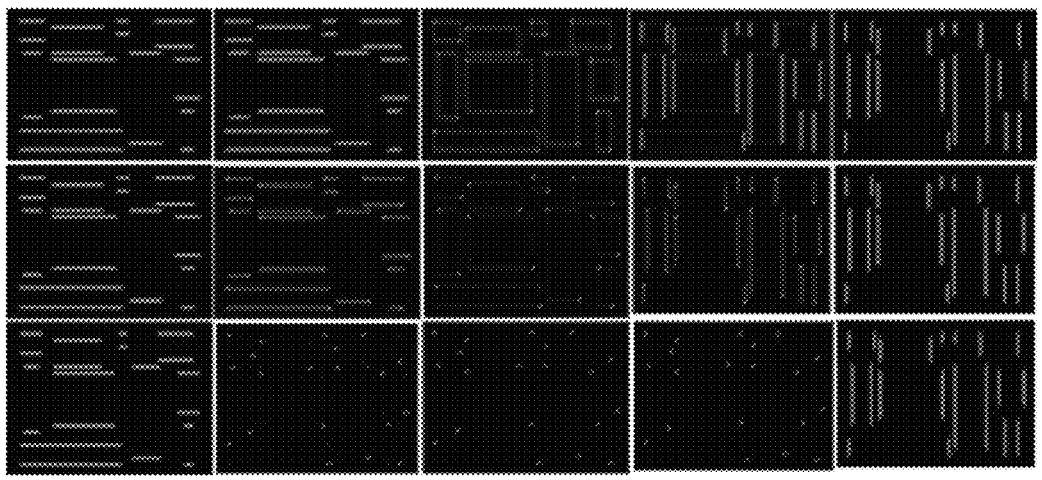

Referring to FIG. 8b, FIG. 8b shows a result obtained by using (a) of FIG. 8a as an input image. In FIG. 8b, columns respectively show channels of (0°, 22.5°, 45°, 67.5°, 90°) from the left. In addition, among rows, the first row shows a result obtained by using only feed-forward filtering, the second row shows a result obtained by performing the lateral inhibition, and the third row, namely the final row, shows a result obtained by performing the recurrent input process twice. In other words, these diagrams are to show qualitative results.

Next, referring to FIG. 8c, FIG. 8c shows results obtained by using (a) and (b) of FIG. 8a as an input image, respectively, and reveals the performance evaluation on whether the proposed band-pass filtering method effectively removes an edge in an orientation which should be inhibited not to pass.

In the first table of FIG. 8c, the first row shows an output result of each stage of the proposed method, and each numeral represents the number of pixels whose output value is 20 or above. After the recurrent input process is performed twice in FIG. 8c, if the final inhibitory feedback is performed, it may be found that the number of pixels whose output value is 20 or above is greatly decreased in channels other than 0° and 90° (namely, it may be found that the performance is greatly improved).

In addition, referring to the second table of FIG. 8c, after the recurrent input process is performed twice, if the final inhibitory feedback is performed, it may be found that the number of pixels whose output value is 20 or above is greatly decreased in channels other than 45° and 135°.

Meanwhile, FIG. 8d shows the performance evaluation on whether the method proposed in the embodiments of the present disclosure accurately allows passage of the edges in orientations, which should pass, different from FIG. 8c. If examining the experimental result proposed in FIG. 8d, it may be found that in most images, the output value of the channel converges on a specific value if the process proceeds to the inhibitory feedback through twice recurrent input processes.

In (a) of FIG. 8a, the number of pixels of 0° is 1180, and the number of pixels of 90° is 1220. In addition, in (b) of FIG. 8b, the number of pixels of 45° is 820, and the number of pixels of 135° is 770. As shown in the table of FIG. 8d, even after going through the final inhibitory feedback process by performing the recurrent input process twice, all edges in orientations, which should pass, are found to accurately pass through the filter.

Figure 9B:
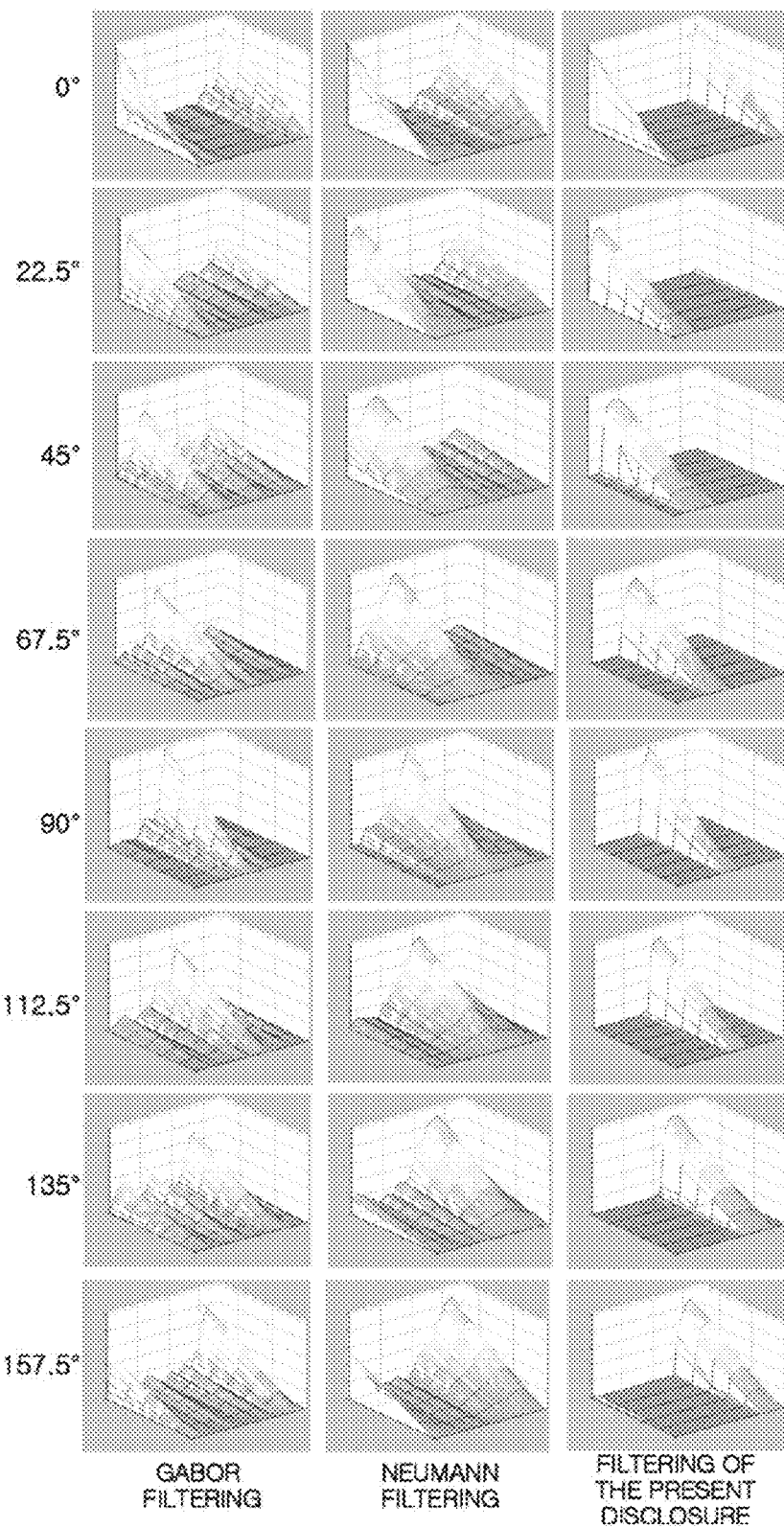

Now, the second artificial image will be described. FIGS. 9a and 9b are diagrams comparatively showing measurement results obtained by measuring performance of an existing image filtering method and the image filtering method according to an embodiment of the present disclosure at various angles with respect to a single input image.

In FIG. 9a, the original image (A) has a single straight line. The straight line has a constant brightness rank as a whole, and a brightness rank of a region other than the straight line is 0. If the method proposed in the embodiments of the present disclosure is performed by using the original image (A) as an input image, output values are calculated for eight channels in total. At this time, a mean output value of each channel may be defined as Equation 8 below.

$$\bar{r}_\theta = \sum_{x,y \in A} r_\theta^{x,y} / N,$$

$$A = \{(x, y) \mid r^{x,y} > 0\}$$

Equation 8

In Equation 8, $r_\theta^{x,y}$ represents an output value at a pixel location (x, y) of each channel. At this time, the pixel location (x, y) is limited as a location of the input image at which the brightness rank is not 0. In addition, N represents the number of pixels which compose a straight line. Therefore, Equation 8 means a mean output value of each channel. However, this is subject to only output values at location corresponding to the straight line in the input image. In the image of FIG. 9a, the orientation of the straight line is 0°, but in this experiment, a straight line image for each of orientations, obtained by 180° into 64 equal parts, is given as an input image. In other words, 64 artificial images in total, including an image including a straight line of 0°, an image including a straight line of 1/64*180°, an image including a straight line of 2/64*180° and so on, are generated. In addition, the input image is generated while varying the brightness rank of the input straight line to 244, 200, 150, 100, 50. Therefore, the number of input images is 320 in total.

Now, FIG. 9b shows a filtering result obtained by performing the image filtering method proposed in the embodiments of the present disclosure with respect to such 320 input images.

In FIG. 9b, the horizontal axis represents a filtering result by the Gabor filter, a filtering result by the Neumann method, and a filtering result by the method proposed in the embodiments of the present disclosure in order. At this time, a value of a filtering response axis uses a value obtained after the final inhibitory feedback process by performing the recurrent input process twice. In addition, the vertical axis represents orientation (angle) applied to the filters, respectively. The orientation applied to a filter is designed to allow edges in the range of +22.5° to −22.5° based on a given angle to pass.

Referring to FIG. 9b, in case of the filtering result by the Gabor filter and the Neumann method, it may be found that an edge is detected to pass at an angle other than the given angle. Meanwhile, according to the method proposed in the embodiments of the present disclosure, it may be found that an edge is accurately detected only at a given angle.

Figure 10:
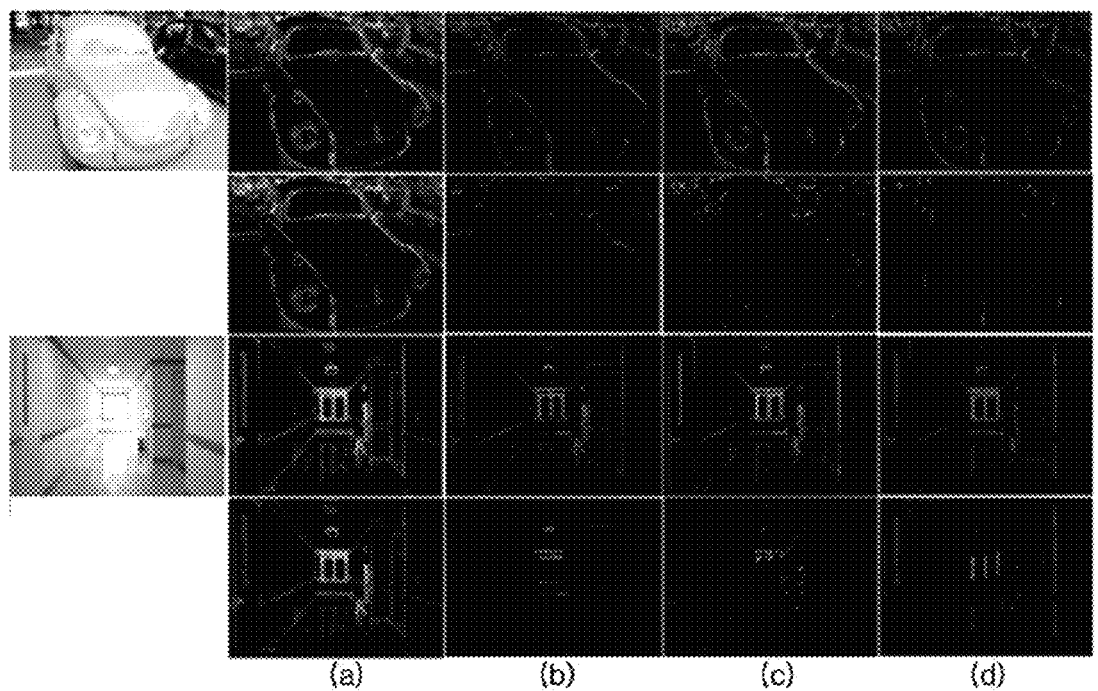
FIG. 10 is a diagram showing an output image generated by performing the image filtering method according to an embodiment of the present disclosure stage by stage with respect to a general image.

Finally, the performance of the embodiments of the present disclosure is examined using two general images. FIG. 10 is a diagram showing an output image generated by performing the image filtering method according to an embodiment of the present disclosure stage by stage with respect to a general image.

In FIG. 10, two images in the left side represent input images, and the other images show filtering results by the image filtering method proposed in the embodiments of the present disclosure. Columns (b) to (d) respectively show channels of 0°, 45°, 90°, and a column (a) is a result obtained by investigating eight channels at each pixel location and taking only a winner. The columns (a) to (d) in the first and third rows show results after performing only feed-forward filtering, and the columns (a) to (d) of the second and fourth rows use a value obtained after the final inhibitory feedback process by performing the recurrent input process twice as an output value.

From the above filtering result, it may be understood that the image filtering method according to the embodiments of the present disclosure may effectively allow edges in a desired orientation band to pass not only in artificial images as shown in FIGS. 7 to 9b but also in general natural images as shown in FIG. 10.

Figure 11:
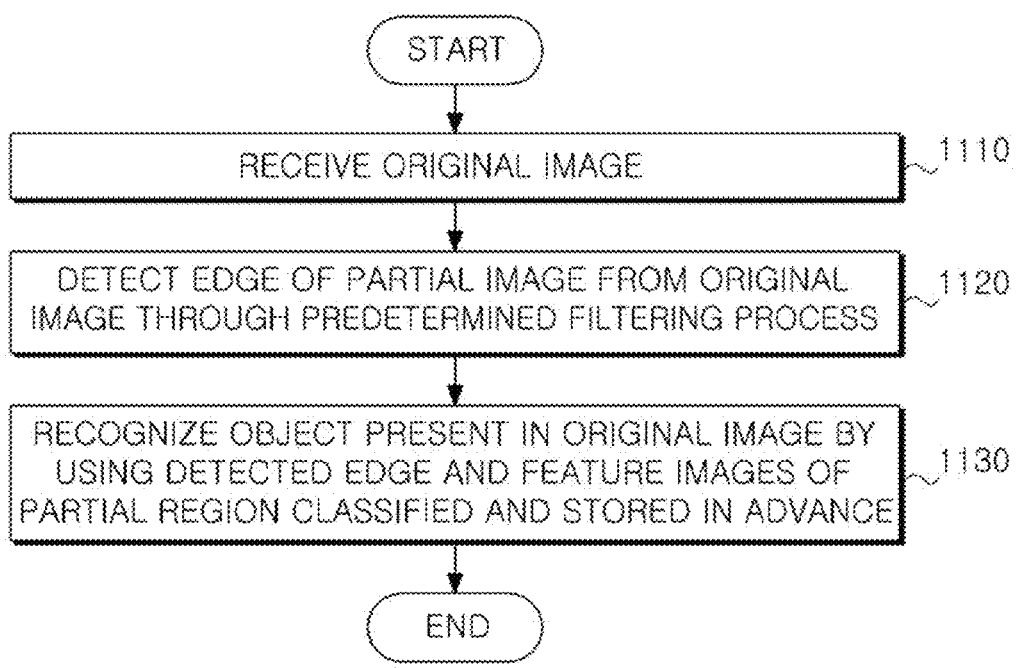
FIG. 11 is a flowchart for illustrating a method for recognizing an image by using the image filtering method of FIG. 3 according to another embodiment of the present disclosure.

Now, a method for recognizing an image by using the image filtering method will be generally described with reference to FIG. 11. The image recognizing method proposed below utilizes the image filtering method without change, and thus the filtering method will not be described in detail here.

In addition, as long as the filtering method proposed in the embodiments of the present disclosure is utilized, it will be easily understood by those skilled in the art that various methods may be used for recognizing an image. Therefore, just an outline for image recognition will be proposed below, and the recognizing method will not be described in detail here.

In Operation 1110, an image recognition device receives an original image.

In Operation 1120, the image recognition device detects an edge of a partial image from the original image by means of the image filtering process described above. In this filtering process, a plurality of first images is generated by filtering the original image with filters respectively generated along a plurality of channels, a second image is generated by selecting a channel having a maximum value for each image unit from the first images, a plurality of third images is generated by filtering the second image with filters respectively generated along a plurality of channels, and the channel of second image is compared with the channel of the third image for each image unit, thereby generating an output image whose edge is detected to maintain the consistency of channel.

In addition, the filtering process may further include feeding back the output image as an input value in the operation for generating the second image.

In Operation 1130, the image recognition device recognizes an object present in the original image input through Operation 1110 by using characteristic images classified and stored in advance and the edge detected in Operation 1120. At this time, the operation for recognizing an object present in the original image may be performed by recognizing an object corresponding to the characteristic images of the partial region which are classified and stored in advance, by using a histogram or hierarchical learning model generated from an orientation component of the edge detected in Operation 1120.

As described above, in the computer vision field, various features have been used to recognize an object. In particular, for such object recognition, it is required to accurately detect an edge which is utilized as basic information for the recognition. Therefore, according to the image recognizing method using the image filtering method, important vision features for object recognition or local area vision feature describing methods may be exactly extracted, which may give an object recognition method with improved performance.

Meanwhile, the embodiments of the present disclosure may be implemented as computer-readable codes on a computer-readable recording medium. The computer-readable recording medium includes all kinds of recording devices in which data readable by a computer system may be recorded. The computer-readable recording medium may be ROM, RAM, CD-ROM, magnetic tapes, floppy disks, optical data storage or the like, or be implemented in a carrier wave form (for example, transmission through the Internet). In addition, the computer-readable recording medium may be dispersed in computer systems connected by a network, and computer-readable codes may be stored and executed in a dispersion manner. In addition, functional programs, codes and code segments for implementing the present disclosure may be easily inferred by programmers skilled in the art.

Industrial Applicability

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The invention claimed is:

1. An image filtering method, comprising:
   receiving an original image;
   generating a plurality of first images by filtering the original image with filters respectively generated along a plurality of channels;
   generating a second image by selecting a channel having a maximum value for each image unit, from the generated first images wherein the image unit represents a basic unit in operation of an image; and
   generating an output image whose edge is detected by filtering the second image with filters respectively generated along the plurality of channels to generate a plurality of third images and comparing the channel of the second image with the channels of the third images.

2. The image filtering method according to claim 1, wherein said generating of an output image comprises:
   generating the plurality of third images by filtering the second image with filters respectively generated along the plurality of channels;
   selecting a channel having a maximum value for each image unit, from the generated third images;
   comparing the channel selected for each image unit from the third images with the channel of the second image; and
   generating an output image by adjusting a value of the corresponding image unit according to the comparison result to maintain the consistency of the channel of the second image and the selected channel of the third images.

3. The image filtering method according to claim 1, wherein when the channel of the second image and the selected channel of the third images are identical to each other as a result of the comparison, a value of the corresponding image unit is set as a value of the output image.

4. The image filtering method according to claim 1, wherein when the channel of the second image and the selected channel of the third images are not identical to each other as a result of the comparison, a value of the corresponding image unit is decreased and set as a value of the output image.

5. The image filtering method according to claim 1, wherein the consistency of channel has a higher value when the channel for generating the second image is identical to the channel selected for generating the third image.

6. The image filtering method according to claim 1, further comprising:
   feeding back the output image as an input value in the operation of generating the second image.

7. The image filtering method according to claim 6, wherein the feeding-back operation is repeated a predetermined number of times.

8. The image filtering method according to claim 1, wherein the channel represents a preset specific angle, and wherein the filter selectively detects an image of the set specific angle from the input image.

9. The image filtering method according to claim 1, wherein the image is filtered by convoluting an input image and a Gaussian filter generated along the channel.

10. An image recognizing method, comprising:
receiving an original image;
detecting an edge of a partial image from the original image by means of a predetermined filtering process; and
recognizing an object present in the original image by using the detected edge and characteristic images which are classified and stored in advance,
wherein the predetermined filtering process includes:
   generating a plurality of first images by filtering the original image with filters respectively generated along a plurality of channels;
   generating a second image by selecting a channel having a maximum value for each image unit, from the generated first images wherein the image unit represents a basic unit in operation of an image; and
   generating an output image whose edge is detected by filtering the second image with filters respectively generated along the plurality of channels to generate a plurality of third images and comparing the channel of the second image with the channels of the third images.

11. The image recognizing method according to claim 10, wherein said generating of an output image comprises:
   generating the plurality of third images by filtering the second image with filters respectively generated along the plurality of channels;
   selecting a channel having a maximum value for each image unit, from the generated third images;
   comparing the channel selected for each image unit from the third images with the channel of the second image; and
   generating an output image by adjusting a value of the corresponding image unit according to the comparison result to maintain the consistency of the channel of the second image and the selected channel of the third images.

12. The image recognizing method according to claim 10, wherein the predetermined filtering process further includes:
   feeding back the output image as an input value in the operation of generating the second image.

13. The image recognizing method according to claim 10, wherein the channel represents a preset specific angle, and wherein the filter selectively detects an image of the set specific angle from the input image.

14. The image recognizing method according to claim 10, wherein said recognizing of an object present in the original image recognizes an object corresponding to the characteristic images of the partial region which are classified and stored in advance, by using a histogram or hierarchical learning model generated from an orientation component of the detected edge.

15. A non-transitory computer-readable recording medium on which a program for executing the method defined in the claim 1 is recorded.

16. The image filtering method according to claim 1, wherein the mage unit includes a pixel.

17. The image recognizing method according to claim 10, wherein the image unit includes a pixel.

18. The image filtering method according to claim 10, wherein said generating the output image comprises:
   when the channel of the second image is identical to the selected channel from the generated third images:
      setting the corresponding basic image unit as a value of the output image; and
      generating the output image with the value of the output image;
   when the channel of the second image is not identical to the selected channel from the generated third images:
      decreasing the value of the corresponding basic image unit;
      setting the decreased value of the corresponding basic image unit as the value of the output image; and
      generating the output image with the value of the output image.

19. An image filtering method, comprising:
receiving an original image;
generating a plurality of first images by filtering the original image with filters respectively generated along a plurality of channels;
generating a second image by selecting a channel having a maximum value for each image unit, from the generated first images wherein the image unit represents a basic unit in operation of an image;
generating a plurality of third images by filtering the second image with filters respectively generated along the plurality of channels;
selecting a channel having a maximum value for each basic image unit, from the generated third images;
comparing the channel selected for each basic image unit from the third images with the channel of the second image;
when the channel of the second image is identical to the selected channel from the generated third images:
   setting the corresponding basic image unit as a value of the output image; and
   generating the output image with the value of the output image;
when the channel of the second image is not identical to the selected channel from the generated third images:
   decreasing the value of the corresponding basic image unit;
   setting the decreased value of the corresponding basic image unit as the value of the output image; and
   generating the output image with the value of the output image.

* * * * *